Dec. 29, 1942.  I. COWLES  2,306,594
HOSE COUPLING
Filed July 24, 1940   2 Sheets-Sheet 1
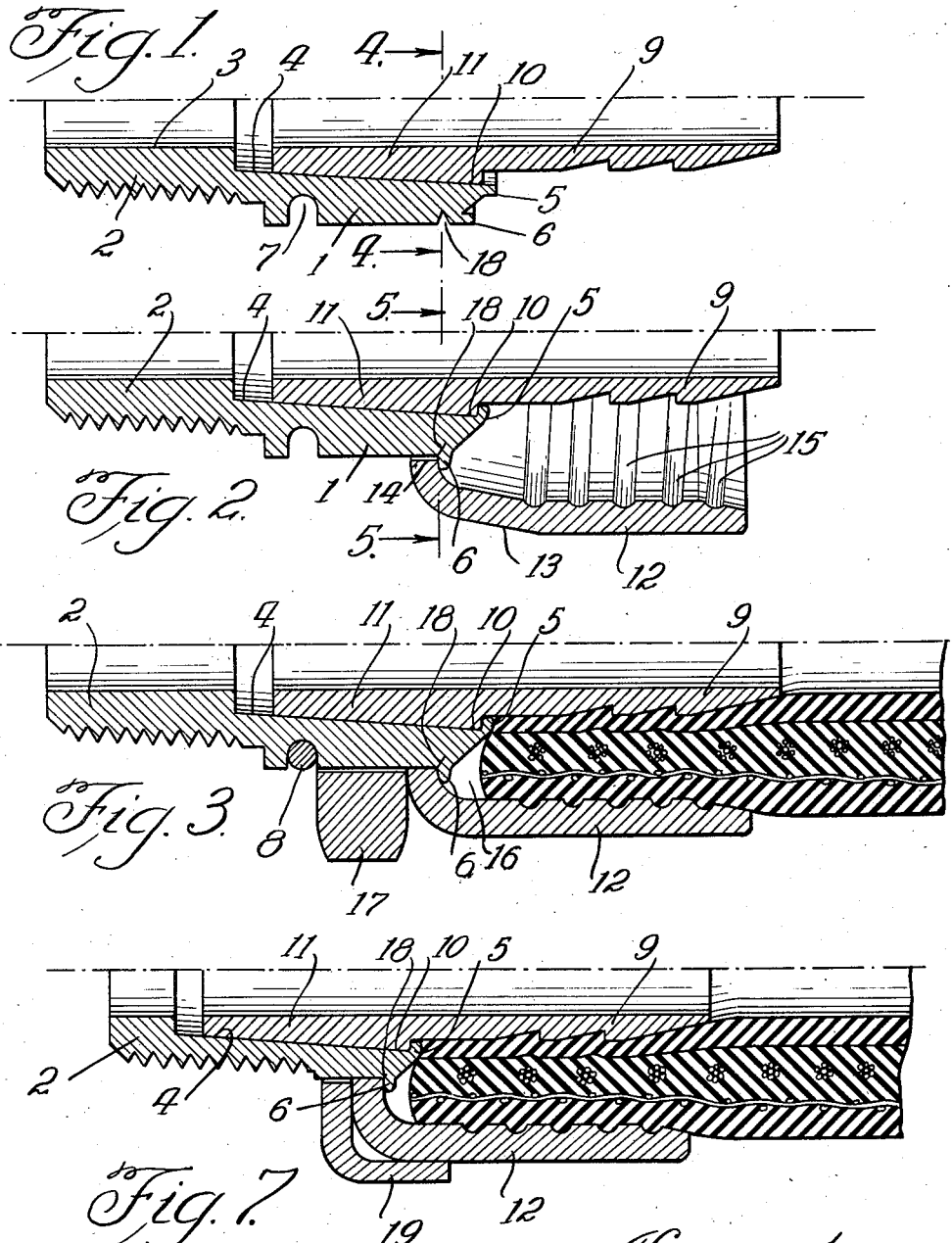
Inventor:
Irving Cowles Dec. 29, 1942.  I. COWLES  2,306,594
HOSE COUPLING
Filed July 24, 1940  2 Sheets-Sheet 2
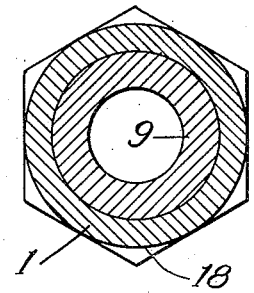
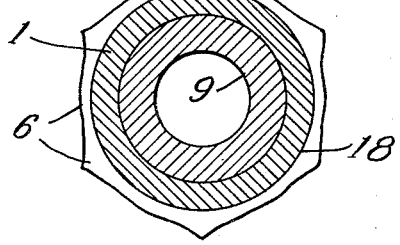
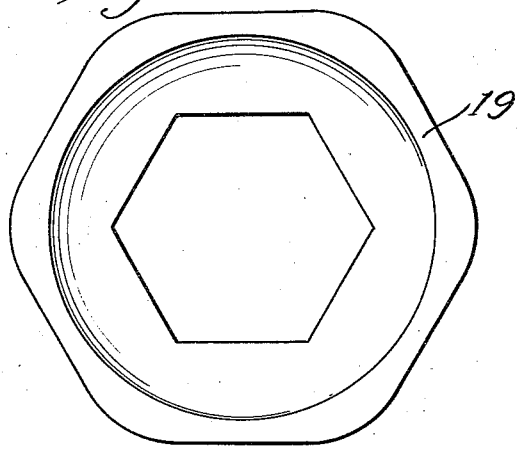
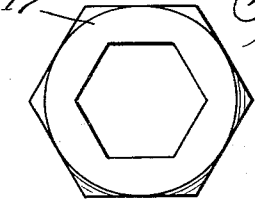
Inventor:
Irving Cowles Patented Dec. 29, 1942

2,306,594

UNITED STATES PATENT OFFICE 2,306,594

HOSE COUPLING

Irving Cowles, Detroit, Mich., assignor to himself and Rudolph W. Lotz, Chicago, Ill., as successor cotrustees of Utility Patents Trust Application July 24, 1940, Serial No. 347,119

3 Claims. (Cl. 138—84)

The present invention relates to a hose coupling of the type known to the trade as the "pressed-on" type wherein the shell is contracted upon the hose-end portion for permanent association therewith and has for its general object to provide a coupling of this type which is not only as efficient as the structures of this type now generally and most commonly used but which possesses numerous advantages over the latter.

One object of the present invention is to greatly reduce the cost of the couplings of this type to the consumer thereof and this object includes that of original production of the coupling at appreciably lower cost than the couplings of this type now in use and the construction thereof in such a manner that the most expensive parts of the same may be easily salvaged for re-use in conjunction with a replacement part thereof which takes the place of the one which must be destroyed to effect said salvaging of the remaining parts of the structure.

A further essential object of the invention is to provide a coupling of the type specified which is adapted to receive an end portion of a hose wherein the inner tube or duct is disposed eccentric to the circumferential surface of the hose and wherein contraction of the shell serves to effect centralizing of said inner tube or duct relatively to the circumferential surface of the hose.

A suitable embodiment of the invention is illustrated in the accompanying drawings, wherein:

Fig. 1 is a fragmentary central longitudinal sectional view illustrating the body member and stem of a hose-coupling constructed in accordance with the invention in their primary assembled positions.

Fig. 2 is a view similar to Fig. 1 showing the body member and stem in their permanently assembled relation, a peripheral flange formed at the stem end of the body member, and a radially contractible coupling shell mounted in place on the body member.

Fig. 3 is a view similar to Fig. 2 showing a hose end portion projected over the stem and into the shell and the latter contracted throughout its entire length and a nut mounted upon the body member.

Fig. 4 is a transverse sectional view of the structure taken on the line 4—4 of Fig. 1.

Fig. 5 is a transverse sectional view of the structure taken on the line 5—5 of Fig. 2.

Fig. 6 is an end elevation of the nut shown in Fig. 3.

Fig. 7 is a view similar to Fig. 3 showing a shorter body-member and a sheet metal nut overhanging the rear end of the shell.

Fig. 8 is an end view of the nut looking at end of the latter which overhangs the shell.

As illustrated in the Cowles Patent No. 1,752,976, which shows and describes the pressed-on type of coupling most generally used, the whole structure is composed of a single piece of metal by automatic screw-machine operations from hexagonal rod. The stem of the coupling is substantially cylindrical internally and externally and the surrounding portion of the shell is of smaller diameter than the hexagonal wrench engaging portion lying between the shell and the nipple of the structure.

In the patented structure, the said shell is contracted progressively from its mouth toward said hexagonal portion after insertion of the hose-end portion, and in view of the fact that a sufficient length of said shell must be contracted in order to obtain sufficient hold on the hose by the shell and stem to prevent withdrawal of the hose by tension, and to assure a fluid-tight connection between hose and stem under the influence of the highest pressure that the hose will withstand without bursting, the length of the shell is necessarily about twenty-five per cent longer than it would need to be if it could be contracted uniformly through its length.

As these couplings are usually made of brass, because of greater ease and rapidity of production than if made of steel, and because of the junk-value of the shavings, a saving of length of rod required for their manufacture is of very material importance independently of every other saving.

Obviously reduction in cross-sectional area of the hexagonal rod used in manufacture of couplings of the same size is even more important than decrease in length of the amount of rod per coupling required for production. Hence, savings in both length and diameters of rod used effects a very marked saving in cost of material alone.

The cutting away of the large amount of material required to render the shell cylindrical externally and internally and to produce the annular cavity to receive the hose-end portion, plus the amount of material required to be cut away to produce the nipple at the other end of the coupling, renders the manufacture of the latter costly and relatively slow.

Another disadvantage of the single piece structure of the aforesaid patent lies in the fact that in much of the hose used in connection with same, the inner tube or duct is eccentric to the circumferential surface of the hose and this has required that the outer surface be skived off throughout substantially the length of the hose to be received within the coupling-shell to render said outer surface concentric with the inner tube or duct and this added operation not only adds to the cost, but also reduces the normal volume of material that should be inserted into the shell in order that radial compression of the hose may be such, with respect to the stem, that a fluid tight joint may be assured such as will prevent leakage under the highest fluid pressure that the hose will withstand. This is due to the fact that the dies used to contract the shell are designed to contract the latter to only a predetermined degree regardless of whether the hose is normal or abnormal with respect to the position of the duct relatively to the circumferential surface of the hose by a single contracting operation which, if increased in degree, would result in fracturing the shell or producing other undesirable results.

For example, if the same contracting die is used in instances of normal hose as in skived-away hose, the displacement of hose-wall material against the inner end wall of the shell will either burst the shell, or cause reverse travel of the excess material toward the mouth of the shell and stem and cause contraction of the duct of the hose beyond the end of the stem and thus reduce or choke flow through the hose at that point, it being well known that rubber and like materials cannot be compressed to any appreciable degree but are mainly displaced in the coupling thereof.

It is also well known in the art that the shells of the couplings of the type referred to will not stand a second contracting operation without loss of a very appreciable percentage of couplings, due to fractures of the shells thereof, and such loss involves also the loss of the hose because most of the latter is cut to prescribed lengths and the shorter lengths which can be salvaged in some instances are of little or no value.

Another feature of disadvantage of the pressed-on type of hose coupling lies in the fact that when the hose gives out between couplings, it and the latter become junk salable at only the weight-value of the couplings.

The coupling of this invention comprises a body-member 1 composed of a relatively short length of rod, preferably of hexagonal cross-section, which is integral with the nipple 2, has an axial bore 3 which is cylindrical through the nipple and is very slightly flared as at 4 through at least a part of the length of said body portion, the taper of said flared portion of said bore being at an angle of less, preferably, than ten degrees to its axis.

The said end of the body portion 1 is provided with an annular flange 5 bordering the mouth of the flared portion 4 of said bore and is also provided with a flange or collar formation 6 bordering the outer surface of said body portion.

Preferably the end surface of the body portion 1 between the flanges 5 and 6, is tapered so that the base of the flange 6 is disposed nearer the nipple 2 than the base of the flange 5.

The body portion 1 is made in lengths to suit the uses for which the completed coupling is to be adapted and, generally is equipped with an annular groove 7 which is adapted to receive a split collar 8 of wire.

The length of rod from which the body number 1 and nipple 2 are composed, need have only a small percentage of its volume of metal removed to form the integral structure above described, the production thereof being thus rendered rapid and economical because of the very limited waste of material regarded in the light of the small value of the shavings compared with the value of rod material.

The stem member 9 is cut from a length of round rod of little or no greater diameter than the largest diameter portion 10 of said member, said portion 10 constituting the inner terminus of the tapered portion 11 which is of appreciably less length than the tapered bore portion 4 of the body member, said portion 10 being of very slightly smaller diameter than the mouth of said bore portion 4. Said stem member is provided with a central bore which is of no greater, but may be of smaller, diameter than the cylindrical bore of the nipple 2.

In the production of the stem member 2 the amount of metal removed from the round rod is of minimum volume also and, therefore, of minimum cost.

The portion 11 of the stem member 9 is driven into the tapered bore portion 4 of the body member and the flange 5 of the latter is then turned inwardly and downwardly by suitable means, such as a power-driven riveting plunger, into close pressure contact with the annular shoulder bordered by the portion 10, the stem member being thus permanently connected with the body member so firmly and permanently as to be substantially integral therewith against all stresses which might tend to separate said member under the most trying conditions of the use for which the assembled structure is intended.

Either before or after the stem member is connected with the body member, the flange 6 of the latter is turned outwardly by means of the same type of operation as is employed to turn the flange 5 inwardly. The flange 6 thus is converted into an outwardly projecting peripheral flange.

The shell 12 of the coupling may be produced in any suitable manner as from a length of round rod which is bored and threaded by very simple and rapid screw machine operations for the reason that the inner diameter of said shell allows for a far greater range of tolerance than is true of the outer diametric dimensions of the stem member 9 and, because of the shell is a far more sturdy part than said stem member 9, the boring of the rod to hollow it may be done by what is commonly referred as "hogging out."

The shell 12 is tapered as at 13 along its rear end portion and emerges into the arcuate corner portion 13ª, which constitutes the end wall of said shell. The said tapered portion is short and of a length equal to about one-half the cylindrical portion of the shell. After contraction of the shell it is rendered cylindrical from its mouth to said arcuate corner portion 13ª, as shown in Figs. 3 and 7.

The end wall of the shell is equipped with a central opening 14 of the shape of and adapted to receive telescopically the body portion 1, said opening 14 being of slightly larger diametric dimensions than the member 1 so that when said shell is mounted upon the body member it is capable of being disposed appreciably angularly to the axis of the stem member and is capable of a movement relative to the latter. This permits the outer end of the stem member 9 to be positioned eccentrically to the mouth of the shell for the reception into the shell and over said stem, of a hose end portion wherein the inner tube or duct is eccentric to its circumferential surface, the stem being preferably of such length as to project beyond the mouth of the shell when the latter is engaged with the flange 6.

Obviously during the hose inserting operation the hose duct is disposed over the projecting portion of the stem 9 and the mouth of the shell is then brought into hose end receiving position, the hose and coupling being then rotated relative to each other to effect screwing the hose end into place by means of the inner threads 15 of the shell.

When this operation is completed the thicker portions of the hose wall will be displaced to an appreciable degree to render the outer surface thereof more nearly concentric with the inner tube or duct of the hose. The inner extremity of the hose end is then still spaced from the flange 6 and thus there is left in the rear end of the shell a free annular space or chamber 16 for the reception of hose wall material displaced during contraction of the shell, such contraction being preferably progressive from the mouth of the shell throughout the entire length of the latter and to the degree necessary to contract the end wall of the shell so that it embraces the body member 1 tightly.

The shell contracting operation effects further and usually complete remedying of the lack of concentricity between the inner tube or duct and the circumferential wall of the hose.

In most instances the contraction of the shell completes one end portion of a conduit of which the hose and coupling form parts, the projecting body portion 1 being engageable by a wrench for effecting engagement of the nipple 2 with for example, a source of supply of fluid under pressure.

If however, access to the member 1 is difficult, a nut 17 may be mounted upon the member 1 and held in place between the shell and the split collar which is, of course, mounted in place after the nut 17 is in place.

In instances where space to receive the complete conduit is very limited, the body portion 1 may be of no greater length than the thickness of the end wall of the shell and a pipe wrench may be applied to the shell for effecting connection of the nipple 2 with a companion part.

An advantage of the structure lies in the fact that the body member may be made of one metal and the stem member and shell of another or respectively different metals but the ultimate and greatest advantage thereof lies in low first cost and in the fact that the shell is easily removed by a longitudinal saw cut extending throughout its length and radially aligned with a corner of the body member 1 and down to or even through the flange 6. Owing to the pressure of the hose end upon the inner wall of the shell the latter opens up easily when moved as aforesaid and generally breaks apart before the saw cut meets the flange 6. The open shell is then easily removed from the hose end and body member and the hose end then removed from the stem member, all parts of the structure except the shell being thus salvaged for reuse.

As the salvaged parts constitute the most expensive parts of the whole coupling, the saving to the consumer is very appreciable.

In turning the flange 6 to project outwardly, the greatest mass thereof is disposed at the points of greatest radius of the body member as shown in Fig. 5 and to facilitate this bending operation the body member may be provided with a groove 18, as shown, which are closed when said flange 6 is bent outwardly and toward the nipple 2.

Obviously the radial contraction of the coupling-shell is effected most economically by a single operation and is best effected by passing the shell through a split die having a cylindrical passage of the diameter equal to that to which the outer diameter of the shell is to be reduced. Such a die is illustrated in the aforesaid Cowles patent.

In effecting contraction of the shell, the end wall of the latter is disposed upon a tubular post into which the nipple and rear portion of the body member project, the outer diameter of said post being very slightly less than the diameter of the cylindrical bore of the contracting die. Preferably the latter is disposed upon the bed plate of a punch-press of which the said post constitutes the plunger.

As the particular method and means for effecting contraction of the shell constitute no part of this invention, illustration of such means is omitted.

The degree of contraction of the coupling shell preferably is such that the end wall of the latter will be contracted to the extent required to effect a snug or tight fit between said end wall and the body member, though a less degree of contraction may be effected without affecting the efficiency of the coupling or the conduit of which it becomes a part.

The application of a pipe wrench to the cylindrical shell is objectionable so that the nut 17 is preferably added if the length of the body portion permits, or, in place of the nut 17, a cupped sheet metal nut 19 such as is illustrated in Figs. 7 and 8 may be used, as the thin body of said nut is adapted for a shorter body member than is required for the nut 17.

I claim as my invention:

1. A hose coupling including a non-cylindrical body member equipped with an axial stem and with a collar adjacent said stem, a unitary contractible cup-like shell having an end portion of smaller average diameter than the main mouth portion thereof and which includes an end wall provided with a central aperture of appreciably greater diametric dimension than said body member and through which the latter projects telescopically and is held against more than limited rotation with respect to said shell, the inner face of the end wall of the latter being engaged with said collar against movement in the direction of said stem, a portion of said shell adjacent to and merging into said end wall being tapered.

2. A hose coupling including a non-cylindrical body member equipped with an axial stem and with a collar adjacent said stem, a unitary contractible cup-like shell having an end portion of smaller average diameter than the main mouth portion thereof and which includes an end wall provided with a central aperture of appreciably greater diametric dimensions than said body member and through which the latter projects telescopically and is held against more than limited rotation with respect to said shell, the inner face of the end wall of the latter being engaged with said collar against movement in the direction of said stem, said end wall of said shell being arcuate in longitudinal section and a portion of said shell merging into said end wall being tapered.

3. A hose coupling comprising a non-cylindrical body member equipped with a stem and with a stop formation adjacent said stem, a cuplike shell including a cylindrical mouth portion and a tapered end portion merging into an end wall equipped with a central aperture corresponding in shape with but of appreciably larger diametric dimensions than said body member and telescopically engaged with the latter and disposed in engagement with said stop formation, said shell, before insertion of a hose end portion into the same, being capable of limited rotation upon said body member and of being disposed axially angularly of the latter to cause the stem to become disposed eccentric and axially angular to said shell, the latter, including the end wall thereof, being contractible radially about a hose end portion disposed over said stem and cause said end wall to become contracted and rigidly engaged with said body member while the shell is rendered cylindrical throughout its length and axially aligned with said stem and body member.

IRVING COWLES.